Figure 1:
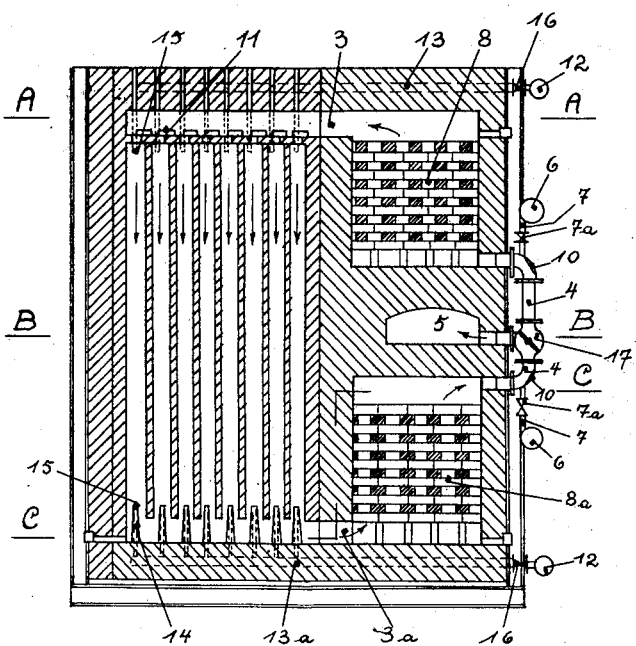

Dec. 11, 1928.

C. OTTO 1,695,204

VERTICAL CHAMBER COKE OVEN

Filed Nov. 2, 1926

Carl Otto INVENTOR

BY M. F. Bissing
ATTORNEY

Patented Dec. 11, 1928.

1,695,204

UNITED STATES PATENT OFFICE.

CARL OTTO, OF ESSEN-RUHR, GERMANY.

VERTICAL-CHAMBER COKE OVEN.

Application filed November 2, 1926, Serial No. 145,793, and in Germany October 14, 1925.

The invention relates to coke ovens having vertical coke chambers and a regenerator disposed only at one narrow side of the chamber. The invention has for its object to obtain, besides a practically perfect possibility of regulating the heating power in the different levels of the heating walls, a very simple gas conduit and at the same time a very compact structure of the oven.

This object is obtained according to my invention by the fact that the regenerators are arranged so as to form two superimposed horizontal rows, having a horizontal wall common to the rows of regenerators, the waste heat flue being disposed in said wall between said rows, the passages and conduits leading on the one hand from the regenerators to the waste heat flue, and to the flues of the associated heating walls on the other hand being so arranged, that the upper regenerators are flowed through by the combustibles to be preheated from bottom to top and by waste heat from top to bottom, whilst an inverse direction of flow prevails in the lower regenerators. In this manner it is possible to conduct the combustibles through the oven plant without any roundabout way in a nearly closed circular ring or, in a C-shaped way. This arrangement results in the very important advantage that the regulating means, that is the dampers, nozzles and the like for the regulation of the draught of the individual heating flues of each heating wall need to be adjusted only one time and stand right even when the direction of flow is reversed. In contradistinction thereto, with known oven types the regulating means stand right during the one stage of operation, but directly wrong when the regenerators have been reversed. Now, proposals have already been made, which obviate this drawback, but very long and repeatedly bent channels, connecting the regenerator with the heating wall, were then used, which of course required, besides the necessary increase of the draught, a much more expensive and more complicated construction of the oven. In contrast thereto, with the oven according to my invention only the shortest possible ways for the combustibles are required, whilst its structure is very simple and clear and, therefore, reliable in service.

Figure 3:
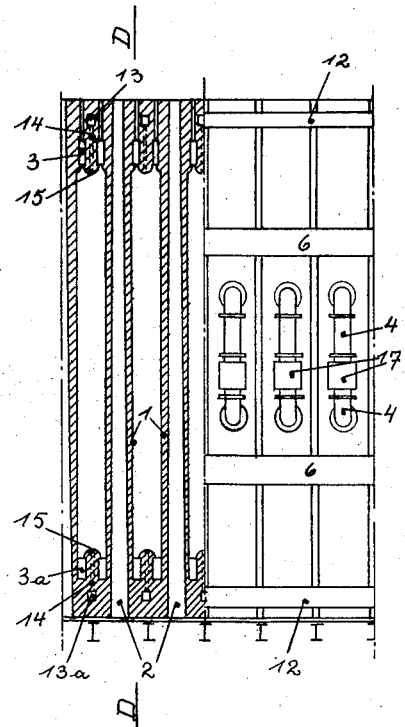
Figure 2:
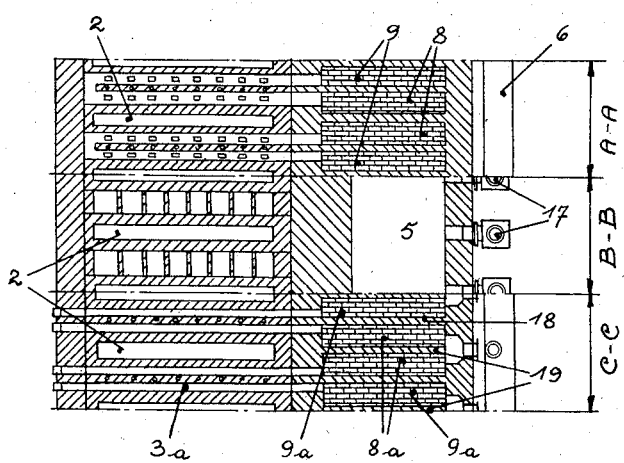

My oven is adapted to be built as a pure lean gas or strong gas oven or also as combined oven for selective or common heating by strong and lean gas. This latter embodiment is illustrated by way of example in the drawing which accompanies and forms part of this specification. In this drawing shows:

Fig. 1 a longitudinal section through the oven plant,

Fig. 2 cross sections of Fig. 1, at different levels,

Fig. 3 a front view of one narrow side of the oven, partly in section, of the oven of Fig. 1.

1 denotes the heating walls arranged between the individual vertical coke chambers 2. The coke chambers have broad and narrow sides and the heating walls, each provided with a plurality of vertical heating flues, extend along the broad sides of the chambers. At the top and bottom end of each heating wall there is provided a distributing passage 3, 3$^a$, respectively, which is in the usual way in communication with the regenerators allotted thereto. All said regenerators are located at one narrow side of the chambers and are connected with the waste heat flue 5 by pipes 4. As it will be seen from Fig. 1, the waste heat flue 5 common to both regenerators is arranged between the upper and lower regenerators, in the horizontal wall common to the rows of regenerators. Furthermore, each second regenerator of the upper as well as of the lower row is in communication with the lean gas main 6 by a pipe 7 which branches off from said main 6 and opens into the respective pipe 4. Each of these branch pipes 7 may be shut off in the usual manner from their associated upper or lower regenerators 8 and 8$^a$, respectively, by means of a valve 7$^a$. Between the gas regenerators 8, 8$^a$ are arranged upper regenerators 9 and lower regenerators 9$^a$ which serve to preheat the air and may be brought into communication with the atmosphere by flaps 10 provided on the pipes 4. A similar flap is provided for each gas regenerator. As best seen from Fig. 3, each of the above-mentioned distributing passages 3, 3$^a$ is subdivided so as to form a separate gas and air channel, so that the combustibles unite for combustion only after having passed through these separate channels and upon entering the indivdual heating flues. The control of the draught conditions for the individual heating flues is effected by slide bricks 11.

The strong gas is fed through conduits 13,

13ª which are branched off from the strong gas main 12 and are located respectively in the cover and bottom of the oven, and branch channels 14 are provided leading from them to the burners 15 which project into the individual heating flues. Each conduit 13 and 13ª may be shut off from the strong gas main 12 by means of a valve 16.

In the one stage of operation, in which the combustibles flow through the oven in the direction of the arrows, Fig. 1, gas and air enter the upper regenerators 8 and 9 from below and leave them on the top where they enter the separate distributing passages 3. From them they flow through the openings controlled by the slide bricks 11 into the flues of the respective heating walls 1 and unite for combustion at the top of each flue. The products of combustion flow through the flues from top to bottom and pass to the associated lower regenerators 8ª and 9ª through the lower distributing passages 3ª. After having passed through these regenerators from bottom to top, the waste heat arrives in the waste heat flue 5 through the pipes 4. When the draught is reversed, an inverse flow takes place, in which the operation of the upper and lower regenerators and direction of flow is exchanged. The common waste heat flue 5 is thereupon brought into communication with the upper regenerators 8 and 9 by throwing over the damper 17, Fig. 1. It will clearly be seen that by feeding either the upper or the lower regenerators the greatest supply of heat may be directed either to the top or to the bottom end of the heating walls.

When the oven is to be heated by pure strong gas the regenerators 8 and 8ª are shut off from the lean gas main 6 and serve now to preheat the air, like the regenerators 9 and 9ª. According to the direction of flow prevailing, the upper strong gas conduits 13 or the lower ones, 13ª, are alternately fed with gas, which unites with the preheated air at the upper or lower burners 15. As to the rest, the mode of operation is the same as with pure lean gas heating.

As with the greatest part of the modern combined ovens the strong and lean gas heating may periodically be effected alternately or combinedly in my novel oven too, as will be understood without further explanation. When the oven is operated with a combined strong and lean gas heating, it is of course possible in a still higher degree to heat the upper or lower portion of each heating wall more powerfully, than with pure strong or lean gas heating.

As it will be seen from Fig. 2 of the drawing, the individual gas and air regenerators are separated from one another by strong partitions 18 which prevent with certainty any mutual transition of gas or air. Furthermore, each individual regenerator has arranged in it a central wall 19 dividing it into halves. This central wall serves to take up the lateral pressure exerted by the masonry of the chamber. The two regenerator halves are provided with a common pipe 4 which is in communication either with the lean gas main 6 and the outer air, respectively, or, after reversal, with the waste heat flue 5. In order to obviate differences of pressure in the regenerator halves, the central walls may be built as perforated walls or entirely be dispensed with. In the latter case always two neighboring heating walls are supplied each from a gas regenerator and an air regenerator. The checker work of the regenerators is so fine-meshed, that a uniform distribution of the gas or the air over the entire surface of the regenerator is secured. Furthermore, an advantage is offered by the fact, that also in case of an unequal supply to the individual regenerators said unequal supply is compensated for automatically by the resistance offered by the fine meshed checker work to the medium flowing through it, this resistance increasing with the power of the increasing speed of said medium.

I claim:—

1. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being connected to said heating flues and being arranged in two superimposed rows, having a horizontal wall common to the rows of the regenerators, and a waste heat flue arranged in said wall and means for connecting said waste heat flue with either of the rows of regenerators.

2. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows and having a horizontal wall common to the rows of regenerators, a waste heat flue arranged in said horizontal wall, a lean gas main, passages connecting said regenerators with said heating flues, other passages connecting said regenerators to said waste heat flue and said lean gas main, and means for shutting off said other passages.

3. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows, and having a horizontal wall common to the rows of regenerators, a waste heat flue arranged in said horizontal wall, a lean gas main, passages connecting said regenerators with said heating flues, other passages connecting said regenerators to said waste heat flue and said lean gas main, means for shutting off said other passages and means adapted to connect said other passages with the atmosphere.

4. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows, and having a horizontal wall common to the rows of regenerators, a waste heat flue arranged in said horizontal wall, a lean gas main, passages connecting said regenerators of the upper row with said heating flues at the tops of said heating walls, other passages connecting said regenerators of the lower row with the flues at the bottoms of said heating walls, conduits connecting said regenerators to the waste heat flue and the lean gas main, means for shutting off said conduits and means adapted to connect said conduits with the atmosphere.

5. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows, and having a horizontal wall common to the rows of regenerators, a waste heat flue arranged in said horizontal wall, a lean gas main, two parallel passages arranged in the top of each of said heating walls and two parallel passages arranged in the bottom of each of said heating walls, said passages connecting the upper and lower regenerators, with said heating flues for supplying gas and air separately to said heating flues, conduits connecting the two rows of regenerators to the waste heat flue and the lean gas main, means for shutting off said conduits and means for connecting said conduits with the atmosphere.

6. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows, and having a horizontal wall common to the rows of regenerators, a waste heat flue arranged in said horizontal wall, a lean gas main, two parallel passages arranged in the top of each of said heating walls and two parallel passages arranged in the bottom of each of said heating walls, said passages connecting the upper and lower regenerators, with said heating flues for supplying gas and air separately to said heating flues, conduits connecting the two rows of regenerators to the waste heat flue and the lean gas main, means for shutting off said conduits, a strong gas main, fuel gas conduits embedded in the cover and the bottom of the oven and connected to the strong gas main, channels connecting said fuel gas conduits with said heating flues of the heating walls, and adjustable means for supplying strong gas from said strong gas main to the cover and bottom fuel gas conduits.

7. A vertical chamber coke oven having a vertical coke chamber with broad and narrow sides and heating walls therefor, provided with heating flues, said heating walls extending along the broad sides of said chamber, regenerators located at one narrow side of the chamber, said regenerators being arranged in two superimposed rows, and having a horizontal wall common to the rows of regenerators, a waste heat flue arranged in said horizontal wall, a lean gas main, two parallel passages arranged in the top of each of said heating walls, and two parallel passages arranged in the bottom of each of said heating walls, said passages connecting the upper and lower regenerators, with the heating flues for supplying gas and air separately to said heating flues, means for individually controlling the cross-sectional area of said passages, conduits connecting the two rows of regenerators to the waste heat flue and the lean gas main, means for shutting off said conduits, a strong gas main, fuel gas conduits embedded in the cover and the bottom of the oven and connected to the strong gas main, channels connecting said fuel gas conduits with said heating flues of the heating walls, and adjustable means for supplying strong gas from said strong gas main to the cover and bottom fuel gas conduits.

In testimony whereof, I have signed my name to this specification.

CARL OTTO.